(12) United States Patent
Corbett et al.

(10) Patent No.: US 8,876,398 B2
(45) Date of Patent: Nov. 4, 2014

(54) SEALING RING WITH AN ELASTIC SPRING LIP

(75) Inventors: Richard Corbett, Fondettes (FR); Samuel Viault, Saint Antoine Du Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/639,115

(22) PCT Filed: Apr. 6, 2010

(86) PCT No.: PCT/EP2010/054497
§ 371 (c)(1),
(2), (4) Date: Nov. 30, 2012

(87) PCT Pub. No.: WO2011/124248
PCT Pub. Date: Oct. 13, 2011

(65) Prior Publication Data
US 2013/0202242 A1     Aug. 8, 2013

(51) Int. Cl.
*F16C 33/76*  (2006.01)
*F16J 15/00*  (2006.01)
*B60G 15/00*  (2006.01)
*F16J 15/44*  (2006.01)
*F16C 19/10*  (2006.01)
*F16C 19/30*  (2006.01)
*F16J 15/34*  (2006.01)
*B60G 15/06*  (2006.01)

(52) U.S. Cl.
CPC ......... *F16C 33/761* (2013.01); *B60G 2204/128* (2013.01); *F16J 15/441* (2013.01); *F16C 19/10* (2013.01); *F16C 19/30* (2013.01); *F16J 15/3456* (2013.01); *B60G 15/068* (2013.01); *B60G 2204/418* (2013.01)
USPC ..................... 384/607; 277/581; 280/124.155

(58) Field of Classification Search
CPC ...... F16C 33/72; F16C 33/78; F16C 33/7816; F16C 33/7836; B60G 11/14; B60G 15/068; B60G 2202/31; B60G 2202/312; B60G 2326/05
USPC ................. 384/607, 609–612; 267/217, 220; 277/447, 580, 581; 280/124.155
See application file for complete search history.

(56) References Cited

U.S. PATENT DOCUMENTS 1,895,167 A * 1/1933 Lighthall ...................... 384/487
2,124,526 A * 7/1938 Goldsworthy ................ 277/362
3,432,174 A * 3/1969 Teske et al. ................... 277/362
(Continued)

FOREIGN PATENT DOCUMENTS

EP     1555144 A2    7/2005
EP     1870265 A1   12/2007
(Continued)

*Primary Examiner* — Alan B Waits
(74) *Attorney, Agent, or Firm* — Bryan Peckjian; SKF USA Inc. Patent Department

(57) ABSTRACT

The axial thrust bearing device, in particular for the suspension strut of a motor vehicle, comprises a bottom support cover, a top bearing cover, a rolling bearing axially disposed between said covers, and at least a sealing ring axially bearing against the bottom support cover and adapted to reduce any ingress of foreign matter between said covers.
The sealing ring comprises at least one friction lip in contact with the top bearing cover and tending to keep said sealing ring in axial contact with the bottom support cover.

17 Claims, 2 Drawing Sheets

(56) References Cited

U.S. PATENT DOCUMENTS

| | | | |
|---|---|---|---|
| 4,708,497 A * | 11/1987 | Lederman | 384/448 |
| 5,439,298 A * | 8/1995 | Zernickel et al. | 384/537 |
| 6,296,396 B1 * | 10/2001 | Schwarzbich | 384/607 |
| 6,814,496 B2 * | 11/2004 | Beghini et al. | 384/617 |
| 6,948,728 B2 * | 9/2005 | Pflugner et al. | 280/124.147 |
| 7,793,941 B2 * | 9/2010 | Springer et al. | 277/579 |
| 7,837,016 B2 * | 11/2010 | Chamousset et al. | 188/321.11 |
| 8,308,176 B2 * | 11/2012 | Lenon et al. | 280/124.147 |
| 8,496,235 B2 * | 7/2013 | Viault et al. | 267/220 |
| 8,496,383 B2 * | 7/2013 | Viault et al. | 384/617 |
| 8,613,557 B2 * | 12/2013 | Gruber et al. | 384/486 |
| 2003/0070898 A1 * | 4/2003 | Wolbers et al. | 192/98 |
| 2005/0058382 A1 * | 3/2005 | Williams | 384/568 |
| 2007/0267793 A1 * | 11/2007 | Chamousset et al. | 267/220 |
| 2010/0308555 A1 * | 12/2010 | Lenon et al. | 280/124.155 |
| 2011/0101584 A1 * | 5/2011 | Viault et al. | 267/221 |
| 2011/0133379 A1 * | 6/2011 | Viault et al. | 267/217 |
| 2011/0291337 A1 * | 12/2011 | Viault et al. | 267/220 |
| 2011/0317954 A1 * | 12/2011 | Saunier | 384/607 |
| 2012/0257849 A1 * | 10/2012 | Corbett et al. | 384/607 |
| 2013/0064489 A1 * | 3/2013 | Corbett et al. | 384/607 |
| 2013/0108200 A1 * | 5/2013 | Berns | 384/477 |

FOREIGN PATENT DOCUMENTS

| | | |
|---|---|---|
| FR | 2918138 A1 | 1/2009 |
| WO | 2009019340 A2 | 2/2009 |
| WO | WO2009106469 A1 | 9/2009 |
| WO | WO2010034734 A1 | 4/2010 |

* cited by examiner

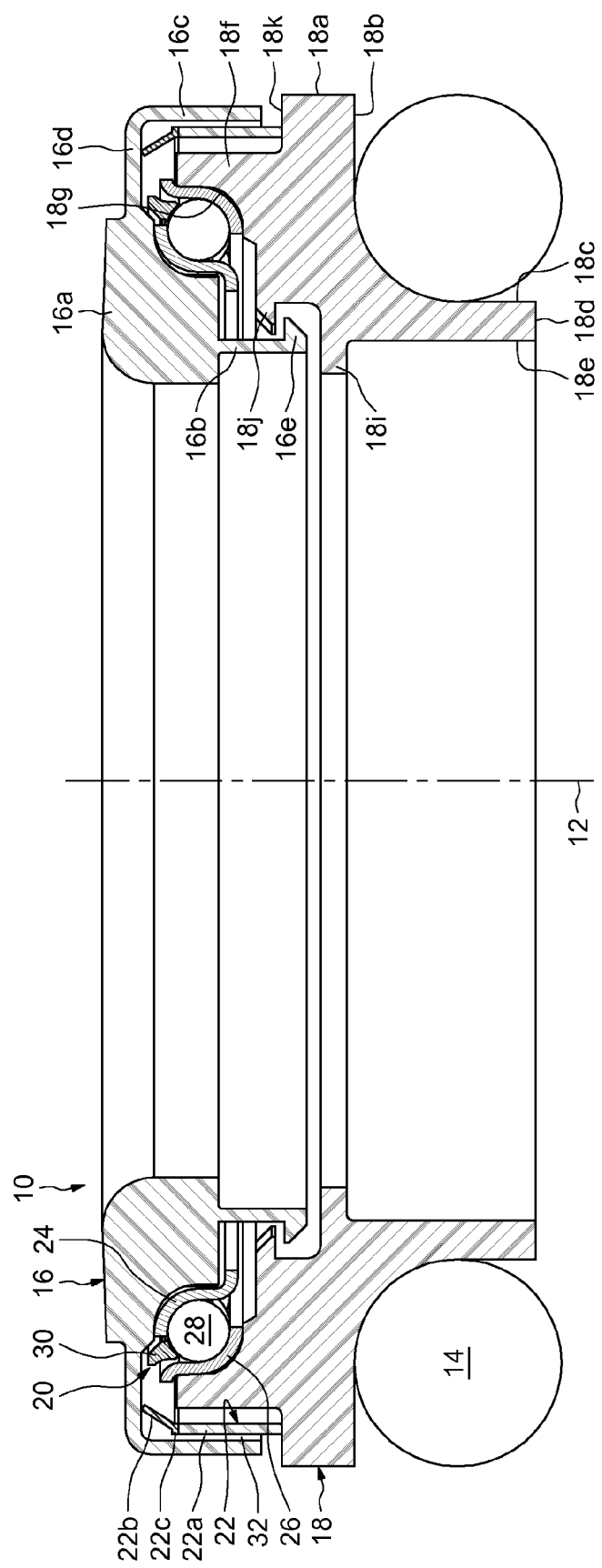

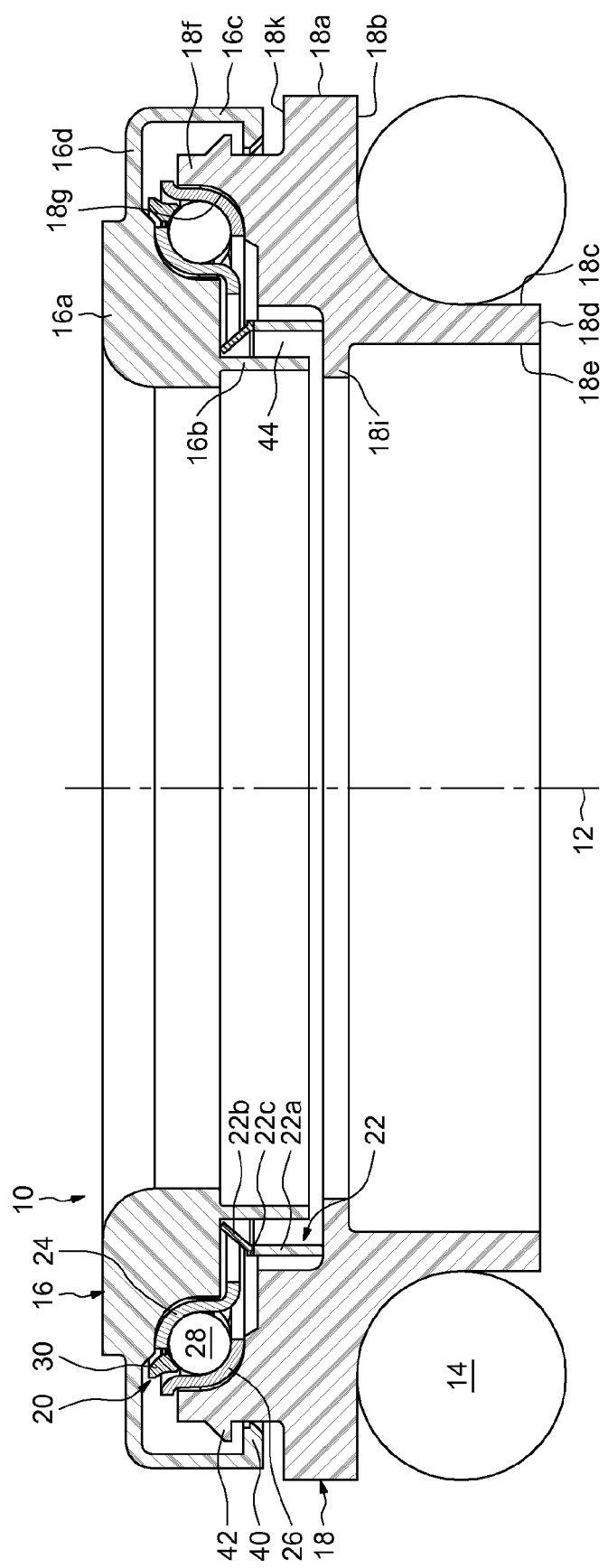

SEALING RING WITH AN ELASTIC SPRING LIP

CROSS-REFERENCE

This application is the U.S. national stage of International Application No. PCT/EP2010/054497 filed on Apr. 6, 2010, which is herein incorporated by reference in its entirety.

FIELD OF THE INVENTION

The present invention relates to the field of axial thrust bearing devices, used in particular on motor vehicles in the suspension struts of the steered road wheels.

BACKGROUND OF THE INVENTION

A suspension thrust bearing device is usually provided with a rolling bearing comprising a top ring and a bottom ring between which are positioned rolling elements, for example balls or rollers, and with bottom and top bearing or support pieces, such as covers or cups. The top and bottom covers form a housing for the rings of the rolling bearing and provide the interface between said rings and the neighboring elements.

A suspension thrust bearing device is positioned in the top part of the suspension strut between the bodywork of the vehicle and a suspension spring. The spring is fitted around a damping piston rod, the end of which is linked to the bodywork of the vehicle through an elastic block that filters the vibrations. The suspension spring axially bears, directly or indirectly, on the bottom cover. The top cover is fixed relative to the bodywork of the vehicle.

The rolling bearing makes it possible to transmit axial forces between the suspension spring and the bodywork of the vehicle, while allowing a rotation movement between the bottom cover and the filtering elastic block. This relative angular movement derives from a steer angle of the steered road wheels of the vehicle and/or the compression of the suspension spring.

The French patent application FR-A1-2 918 138 discloses such a suspension thrust bearing device comprising a bottom support cover, a top bearing cover and a rolling bearing axially disposed between said covers. To limit the intrusion of water, dust and other foreign matter between said covers, the device further comprises sealing rings mounted into radial grooves of the bottom support cover and coming into friction contact with external and internal skirts of the top bearing cover.

With such a device, if the bottom support cover is deformed under the effect of the axial loads of the suspension spring, an axial gap may occur between the top bearing cover and one of the sealing rings.

The European patent application EP-A1-1 870 265 also discloses a suspension thrust bearing device comprising a bottom support cover, a top bearing cover, a rolling bearing and sealing rings axially disposed between said covers. The sealing rings are moveable both axially and radially between the covers.

In this document, due to the design of the seals and to their disposition relative to the bottom and top covers, the sealing obtained between said covers may be insufficient in some operating conditions and foreign matter may reach the rolling bearing.

One aim of the present invention is therefore to overcome the aforementioned drawbacks.

It is a particular object of the present invention to provide an axial thrust bearing device which is simple to manufacture and to assembly, economic, while guaranteeing good sealing properties.

SUMMARY OF THE INVENTION

In one embodiment, the axial thrust bearing device, in particular for the suspension strut of a motor vehicle, comprises a bottom support cover, a top bearing cover, and a rolling bearing axially disposed between said covers. The device further comprises at least a sealing ring axially bearing against the bottom support cover and adapted to reduce any ingress of foreign matter between said covers. The sealing ring comprises at least a friction lip in contact with the top bearing cover. The friction lip tends to keep the sealing ring in axial contact with the bottom support cover.

With the friction lip in contact with the top bearing cover, the ingress of foreign particles is limited between the sealing ring and the top bearing cover. Besides, the sealing lip permits to keep the sealing ring in axial permanent friction contact with the bottom support cover in order to limit the intrusion of foreign matter between these two elements. A good sealing is thus achieved.

The sealing ring may comprise an axial portion having a bottom end axially bearing against the bottom support cover, and the friction lip extending from a top end of the axial portion. The axial portion may be formed of a rigid material and the friction lip may be formed of a flexible material. Advantageously, the friction lip extends obliquely.

In a preferred embodiment, the sealing ring delimits with the top bearing cover at least a labyrinth sealing zone. With such a labyrinth sealing zone between the sealing ring and the top bearing cover, the dissipation of energy is limited.

Advantageously, the sealing ring delimits with the top bearing cover an annular radial labyrinth sealing zone. The axial portion of the sealing ring may delimit together with the top bearing cover the annular radial labyrinth sealing zone.

Advantageously, the sealing ring is resting axially on the bottom support cover.

The rolling bearing may comprise a bottom ring in contact with the bottom support cover, a top ring in contact with the top bearing cover and at least one row of rolling elements mounted between the rings.

In a preferred embodiment, the sealing ring is radially disposed between the bottom support cover and the top bearing cover.

In one embodiment, the sealing ring is radially disposed between the bottom support cover and an external skirt of the top bearing cover. Alternatively, the sealing is radially disposed between the bottom support cover and internal skirt of the top bearing cover.

In a preferred embodiment, the friction lip of the sealing ring bears against a radial surface of the top bearing cover.

Preferentially, the thickness of the tip of the friction lip is smaller than the one of the axial portion from which is issued said friction lip. The friction lip may have in cross-section a triangular shape.

Preferentially, the sealing ring is freely movable in radial direction relative to the bottom support cover and to the top bearing cover.

According to another aspect, it is proposed a suspension strut for a motor vehicle comprising a damper and an axial thrust bearing device as previously defined.

BRIEF DESCRIPTION OF THE DRAWINGS

The present invention and its advantages will be more readily understood by studying the detailed description of specific embodiments, which constitute non-limiting examples of the present invention, and illustrated by the appended drawings on which:

FIG. 1 is a view in axial section of an axial thrust bearing device according to a first example of the invention, and FIG. 2 is a view in axial section of an axial thrust bearing device according to a second example of the invention.

DETAILED DESCRIPTION OF THE INVENTION

As illustrated on FIG. 1, an example of axial thrust bearing device 10, with an axis 12, is installed between a top retainer seat (not shown) suitable of resting, directly or indirectly, in an element of a chassis of the motor vehicle, and a suspension spring 14. The device 10 is disposed around a damper rod (not shown) extending on the axis 12, the spring 14 being installed around said rod.

The device 10 comprises a top bearing cover 16, a bottom support cover 18, a rolling bearing 20 axially disposed between the covers, and a sealing ring 22 radially mounted between said covers to reduce any ingress of foreign matter.

The top bearing cover 16 may consist in one part, for example from plastic material, such as polyamide PA 6.6 which may or may not be reinforced with glass fibers. The top bearing cover 16 comprises a top radial portion 16a designed to be in contact with the top retainer seat, an annular internal axial skirt 16b of small thickness and of small diameter, and an annular external axial skirt 16c of small thickness and of large diameter radially surrounding the internal skirt 16b. The skirts 16b, 16c extend axially downwards from the radial portion 16a. More precisely, the external skirt 16c extends from an edge of large diameter of a radial extension 16d of small thickness of the radial portion 16a.

The rolling bearing 20 is entirely located radially between the skirts 16b, 16c of the top bearing cover 16. The rolling bearing 20 comprises a top ring 24 and a bottom ring 26, between which is mounted a row of rolling elements 28, which in this case are balls. The rolling bearing 20 also comprises a cage 30 between the rings so as to maintain an even circumferential spacing between the rolling elements 28.

The top ring 24 and the bottom ring 26 are made of a thin metal sheet, which has been stamped or rolled so as to define toroidal tracks or raceways for the rolling elements 28 between the two rings. The top ring 24 is in contact with a bottom surface of the radial portion 16a of the top bearing cover 16. The bottom ring 26 is in contact with a top surface of the bottom support cover 18. The concave external surface of the top ring 24 forms the track or raceway for the rolling elements 28, the concave internal surface of the bottom ring 26 forming the track or raceway for said rolling elements.

The bottom support cover 18 may consist in one part, for example from plastic material, such as polyamide PA 6.6 which may or may not be reinforced with glass fibers. The bottom support cover 18 comprises a cylindrical axial external surface 18a of small axial dimension from the bottom end of which extends inwards an annular radial surface 18b which is prolonged towards the inside and downwards by a rounded surface then by a cylindrical axial surface 18c. The axial surface 18c makes it possible to centre the spring 14 whereas the radial surface 18b provides a bearing surface for said spring.

From the bottom end of the axial surface 18c, a radial annular bottom surface 18d extends towards the inside, prolonged from an edge of small diameter axially upward by a stepped axial surface forming the bore 18e of the bottom support cover 18.

From the top end of the axial external surface 18a, the bottom support cover 18 also comprises an annular axial skirt 18f extending axially towards the radial portion 16a of the top bearing cover 16. The skirt 18f radially surrounds the bottom ring 26. The skirt 16c of the top bearing cover 16 radially surrounds the skirt 18f. The top end of the skirt 18f is prolonged towards the inside by a surface 18h in contact with the bottom ring 26 and of a form complementing said ring.

The bottom support cover 18 further comprises an annular radial rib 18i provided on the bore 18e at the vicinity of its top end. The rib 18i is directed radially towards the inside and is axially positioned below the axial skirt 16b of the top bearing cover 16 so as to delimit with said skirt a narrow axial annular passage. In other words, the rib 18i is located slightly away from the axial skirt 16b to form an internal labyrinth sealing portion.

The bottom support cover 18 also comprises, at the top end of the stepped bore 18e, an annular radial rib 18j extending towards the inside in the direction of the internal skirt 16b of the top bearing cover 16. The rib 18j is disposed radially between the top ring 24 of the rolling bearing and the axial skirt 16b. Said rib is disposed axially above hooks 16e arranged on the external surface of the skirt 16b of the cover 16 at its bottom end. The hooks 16e extend radially outwards towards the bottom support cover 18 and are axially spaced apart from the rib 18j. The hooks 16e are advantageously spaced relative to one another in the circumferential direction. Alternatively, a hook continuous in the circumferential direction may be provided on the external surface of the skirt 16b.

The rib 18j has a bottom radial surface able to interfere with hooks 16e. The rib 18j is designed to interact with the hooks 16e in order to prevent a separation of the bottom support cover 18 from the top bearing cover 16 before the device 10 is installed in the top part of the suspension strut. To this end, the external diameter of the hooks 16e is greater than the inner diameter of the rib 18j so that a diametral interference can exist between the covers 16, 18. The rib 18j therefore forms an axial retaining means disposed on the bottom support cover 18 and adapted to interact with complementary axial retaining means of the top bearing cover 16, i.e. the hooks 16e, in order to axially retain said covers one relative to another before the installation of the device 10. Before its installation, the device 10 constitutes a unitary assembly that can be handled, transported, and installed without risk of coming apart.

Otherwise, the hooks 16e and the rib 18j form narrow passageways in order to prevent the intrusion of foreign matter radially between the internal skirt 16b of the top bearing cover 16 and the stepped bore 18e of the bottom support cover 18.

In order to limit the ingress of foreign matter inside the external annular radial space delimited by the skirt 18f of the cover 18 and the external skirt 16c of the cover 16, the sealing ring 22 is disposed radially therebetween.

The sealing ring 22 has an annular shape and is resting axially on an annular radial surface 18k of the bottom support cover 18 delimited between the rib 18f and the axial external surface 18a. The radial surface 18k extends radially inwards the top end of the external surface 18a, its edge of small diameter being connected to the bottom end of the external surface of the skirt 18f.

The sealing ring 22 comprises an annular axial portion 22a and an annular sealing lip 22b extending from said axial portion. The axial portion 22a has a bottom radial end axially bearing against the radial surface 18k of the cover 18 and an opposite top radial end. The axial contact between said surface and the axial portion 22a of the sealing ring prevents the foreign particles from intruding between the sealing ring 22 and the bottom support cover 18. In the illustrated embodiment, the top radial end of the axial portion 22a is axially disposed in a radial plane containing the top surface of the skirt 18f of the cover 18. The axial portion 22a may be advantageously made from plastic rigid material by moulding, for example in polyamide (PA). Alternatively, the axial portion 22a may also be made from metal.

The sealing ring 22 also comprises an annular heel 22c covering the top radial end of the axial portion 22a from which is issued the relatively thin sealing lip 22b. The lip 22b extends obliquely inwards and upwards from the heel 22b and comes into permanent friction contact with a bottom radial surface of the extension 16d of the top bearing cover 16. The lip 22b extends radially inwards and axially upwards in the direction of the bottom radial surface of the extension 16d and bears against this surface.

In the illustrated embodiment, the thickness of the lip 22b is constant. Alternatively, the thickness may reduce from the heel 22c towards its free end or tip which axially bears against the radial portion 16a of the top bearing cover 16. The tip of the lip 22b in friction contact with the cover 16 has in cross-section a triangular shape in order to obtain an annular linear contact with the bottom radial surface of the extension 16d.

With such a contact, when wear appears, there is less friction than with a rounded portion for the tip of the lip 22b. Besides, even if the pressing force of the lip 22b is low, the surface pressure of said lip on the top bearing cover 16 increases. Hence, even with a small interference between said lip and the cover 16, intrusion of foreign matter can be effectively prevented.

Otherwise, the external surface of the axial portion 22a of the sealing ring 22 delimits, with the internal surface or bore of the axial skirt 16c of the cover 16, an annular radial labyrinth sealing zone 32 via annular radial narrow passageway. In other words, the sealing ring 22 is located radially slightly away from the bore of the skirt 16c to form a labyrinth sealing portion. For instance, the radial gap between the bore of the external skirt 16c and the external surface of the axial portion 22a may be less than 1 mm, and for instance comprised between 0,2 and 0,4 mm.

Foreign matter is blocked by the labyrinth sealing zone 32 and thus prevented from intruding between the sealing ring 22 and the top bearing cover 16. Besides, foreign particles especially the very small ones, even if this does pass through the labyrinth sealing zone 32, it is blocked by the friction sealing lip 22b bearing against the cover 16 and thus prevented from intruding inward.

Besides, the sealing lip 22b has another function: to keep the axial portion 22a of sealing ring 22 in axial contact with the bottom support cover 18. The lip 22b acts as an elastic spring having a first end in contact with the radial bottom surface of the radial extension 16d of the cover 16 and an opposite second end bearing against the top end of the axial portion 22a in order to axially urge the bottom end of said portion against the radial surface 18k of the cover 18. The elastic sealing lip 22b axially preloads the axial portion 22a on the cover 18 in order to avoid an axial gap or clearance between the bottom end of the axial portion 22a and the radial surface 18k. The sealing lip 22b forms an axially preload resilient element. The sealing lip 22b exerts a force tending to keep the bottom end of the axial portion 22a of the sealing ring in axial contact with the cover 18. The intrusion of foreign matter between the sealing ring 22 and the bottom support cover 18 is thus prevented.

The heel 22c and the sealing lip 22b are advantageously made in one part and may be obtained by moulding a flexible synthetic material, for example made of nitrile or of elastomere such as synthetic rubber. The heel 22c and the sealing lip 22b may be overmoulded over the top end of the axial portion 22a by overmoulding or even by bi-injection. Alternatively, the heel 22c and the sealing lip 22b may be fixed onto the top end of the axial portion 22a by any appropriate means, for example by gluing.

In a mounted position of the device 10 as illustrated on FIG. 1, the axial contact between the axial portion 22a and the radial surface 18k is the only contact of the sealing ring 22 with the bottom support cover 18. The sealing ring 22 is resting axially on the cover 18. In this mounted position, the axial contact between the sealing lip 22b and the extension 16d of the radial portion 16a is the only contact of said seal with the top bearing cover 16.

The sealing ring 22 is moveable freely relative to the covers 16, 18 in the radial and circumferential directions. Even with such displacements of the sealing ring 22, the friction contacts between the friction lip 22b and the cover 16, and between the axial portion 22a and the cover 18 are maintained. Under the effect of the radial loads of the spring 14, the sealing ring 22 may be into radial contact with the bottom support cover 18 and/or with the top bearing cover 16. However, the contact between the ring 22 and said covers does not generate a friction torque since the ring is only resting on the bottom support cover 18. Besides, this contact is linear and not circumferential.

In case of an axial deformation of the bottom support cover 18 due to the axial loads of the spring 14, the lip 22b may be elastically compressed in axial direction between the axial portion 22a and the extension 16d of the cover 16, and then recovers its initial position by elasticity. In this case, the sealing ring 22 is moveable relative to the cover 16 in axial direction. During the deformation of the lip 22b, the friction contact between said lip and the cover 16 is maintained. Thus, the sealing function of the friction lip 22b is maintained.

The embodiment shown on FIG. 2, in which identical parts are given identical references, differs from the first embodiment in that the sealing ring 22 has a reduced diameter in order to be disposed radially between the internal skirt 16b of the top bearing cover 16 and the stepped bore 18e of the bottom support cover 18, and in that axial retaining means provided to axially retain said covers relative to one another are disposed on the external skirts 16c, 18f of said covers.

The top bearing cover 16 comprises, arranged on the internal bore of the skirt 16c at its bottom end, an annular radial rib 40 extending radially inwards and able to diametrically interfere with an annular rib 42 arranged on the external surface of the skirt 18f of the bottom cover 18 and extending radially outwards. The rib 40 is positioned axially below the rib 42 and spaced apart from said rib. The ribs 40, 42 form narrow passageways in order to prevent the intrusion of foreign matter radially between the skirts 16c, 18f.

The sealing ring 22 is resting axially on the top radial surface of the rib 18i of the bottom support cover 18. In this embodiment, the friction lip 22b extends obliquely outwards and upwards. The lip 22b comes into permanent friction contact with a radial bottom surface of the radial portion 16a of the cover 16. The internal surface or bore of the axial portion 22a of the sealing ring 22 delimits, with the external surface of the skirt 16b of the cover 16, an annular radial labyrinth sealing zone 44.

It should be noted that the embodiments illustrated and described were given merely by way of a non-limiting indicatives examples and that modifications and variations are possible within the scope of the invention. Thus, the invention applies not only to an angular contact ball bearing with a single row of balls but also to other types of rolling bearing, for example bearings having four points contacts and/or with double rows of balls, or with at least three rows of balls. It is easily understood that it could also be possible to use bearing with other types of rolling members such as rollers.

Otherwise, in both disclosed embodiments, the sealing rings forming sleeves are each provided with one friction sealing lip. Alternatively, it may also be possible to foresee sealing rings having a different number of friction lips, for example two lips or more.

In another embodiment, it could also be possible to disposed two sealing rings radially between the bottom support cover and the top bearing cover, the first radially between the external skirt of the top bearing cover and the external skirt of the bottom support cover, and the second radially between the internal skirt of said top bearing cover and the stepped bore of the bottom support cover.

Alternatively, it may also be possible to foresee a sealing ring surrounding the external skirt of the top bearing cover and bearing axially against the bottom support cover. In this case, the friction lip may be into friction contact with the bottom surface of an annular radial rib provided on the external surface of the external skirt of the top bearing cover. In another embodiment, the sealing ring may be disposed inside the bores of the bottom support cover and of the top bearing cover while bearing axially against the radial rib provided on the stepped bore of said bottom support cover. In this case, the friction lip may be into friction contact with the bottom surface of an annular radial rib provided on the internal surface of the internal skirt of the top bearing cover.

The invention claimed is:

1. An axial thrust bearing device for a suspension strut of a motor vehicle, comprising:
    a bottom support cover,
    a top bearing cover comprising a surface that extends perpendicaular to a central axis of the device,
    a rolling bearing axially disposed between said covers, and
    at least a sealing ring axially bearing against the bottom support cover and adapted to reduce any ingress of foreign matter between said covers,
    wherein the sealing ring comprises at least one friction lip in contact with the top bearing cover, the at least one friction lip axially contacting said surface of the top bearing cover so as to bias the sealing ring at least partially in a direction parallel to said central axis of the device and into axial contact with the bottom support cover.

2. The device according to claim 1, wherein the sealing ring includes an axial portion having a bottom end axially bearing against the bottom support cover, and the friction lip extends at least partially along the central axis, from a top end of the axial portion.

3. The device according to claim 2, wherein the axial portion is formed of a first material and the friction lip is formed of a second material, the first material having a grater rigidity than the second material.

4. The device according to claim 2, wherein the friction lip comprises an axial end that defines a pointed tip that contacts the top bearing cover, the pointed tip having a thickness that is less than a radial thickness of the axial portion.

5. The device according to claim 2, wherein the friction lip extends at least partially axially from the top end of the axial portion, toward and into contact with the top bearing cover, such that the friction lip seals a labyrinth zone defined between the top bearing cover and the bottom bearing support.

6. The device according to claim 1, wherein the friction lip extends obliquely to the central axis.

7. The device according to claim 1, wherein the sealing ring delimits with the top bearing cover at least a labyrinth sealing zone.

8. The device according to claim 7, wherein the labyrinth sealing zone is annular.

9. The device according to claim 7, wherein:
    the top bearing cover comprises one or more hooks,
    the bottom support cover comprises a rib that interacts with the one or more hooks to prevent a separation of the bottom support cover from the top bearing cover,
    the labyrinth sealing zone is a first sealing labyrinth zone, and
    a second labyrinth sealing zone is defined at least partially between the one or more hooks and the rib, the first and second labyrinth sealing zones communicating with the at least one rolling bearing and extending on opposite radial sides thereof.

10. The device according to claim 1, wherein the sealing ring is resting axially on the bottom support cover.

11. The device according to claim 1, wherein the sealing ring is radially disposed between the bottom support cover and the top bearing cover.

12. The device according to claim 1, wherein the sealing ring is radially disposed between the bottom support cover and an external skirt of the top bearing cover.

13. The device according to claim 1, wherein the sealing ring is radially disposed between the bottom support cover and an internal skirt of the top bearing cover.

14. The device according to claim 1, wherein the friction lip bears against a radial surface of the top bearing cover.

15. The device according to claim 1, wherein the sealing ring is movable in radial direction relative to the bottom support cover and to the top bearing cover.

16. The device of claim 1, wherein the at least one friction lip flexes by the interaction with the bearing cover, wherein an elasticity of the at least one friction lip biases the sealing ring into contact with the bottom support cover.

17. A suspension strut for a motor vehicle, comprising:
    a damper; and
    an axial thrust bearing device, including:
    a bottom support cover,
    a top bearing cover comprising a surface that extends perpendicular to a central axis of the device,
    a rolling bearing axially disposed between said covers, and
    at least a sealing ring axially bearing against the bottom support cover and adapted to reduce any ingress of foreign matter between said covers,
    wherein the sealing ring provides at least one friction lip in contact with the surface of the top bearing cover and adapted to bear on the top bearing cover and force said sealing ring in a direction parallel to a central axis of the device and into axial contact with the bottom support cover.

* * * * *